Patented June 24, 1947

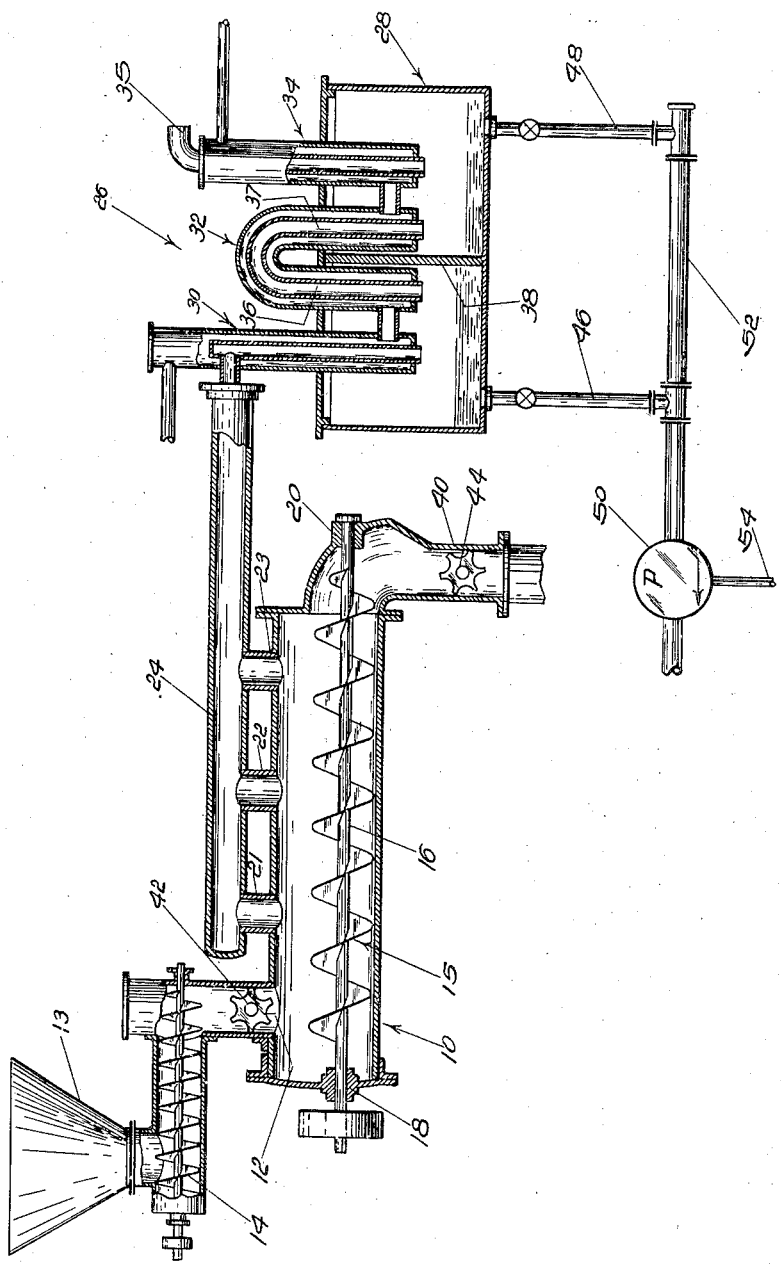

2,422,874

UNITED STATES PATENT OFFICE 2,422,874

PROCESS OF OBTAINING THEOBROMINE AND OTHER PRODUCTS FROM COCOA MATERIALS

Benjamin J. Zenlea, Ozone Park, N. Y., assignor to Rockwood & Co., Brooklyn, N. Y., a corporation of Delaware Application August 12, 1944, Serial No. 549,232

12 Claims. (Cl. 260—256)

1

This invention relates to the recovery of theobromine from cocoa products and by-products such as for example cocoa beans, cocoa shells, cocoa fines, cocoa press cake, cocoa expeller cake, cocoa powder and other cocoa materials containing theobromine. Theobromine is present in cocoa in a free form, and also in a partly combined and complex form.

There are a number of well known methods for the extraction of theobromine, among which are the methods using a mixture of lime and water, or an alcoholic sodium hydroxide solution, or various organic solvents. All of these methods require large amounts of solvents in proportion to the small amount of theobromine, 0.6 to about 3.8%, contained in theobromine bearing materials. All of these methods require the filtration and evaporation of relatively large quantities of solvent before the theobromine can be isolated even in an impure form.

According to a French patent, No. 493,393, August 7, 1919, it is proposed to obtain theobromine by carbonizing cocoa and either extracting the theobromine from the carbonized mass or subliming the theobromine from the carbonized mass, but no disclosure is made in said patent as to how the theobromine can be isolated from either the carbonized coca mass or from the sublimed material. On the other hand, due to the treatment by heat of the cocoa mass various organic products are formed which increase the difficulty and makes complex the isolation of theobromine from either the carbonized cocoa mass or the sublimed mass thereof by methods ordinarily used for the isolation of theobromine from cocoa proper. Furthermore in order to free theobromine from its combined form in cocoa it is necessary to heat the cocoa mass to a temperature substantially above that of the subliming point of theobromine. The carbonized mass would therefore have had a substantial amount of the theobromine volatilized if heated high enough and long enough to substantially free the theobromine in the cocoa mass. The complete sublimation of theobromine from the cocoa mass does not result in a simple theobromine substance but in a complex mixture consisting of condensible vapors and non-condensible gases, acidic and basic substances, tarry substances, large quantities of water, theobromine, and finely divided carbon.

One of the objects of my present invention is to provide a commercially practicable method free from the objections and difficulties of the previous methods referred to above, whereby to obtain theobromine by treating cocoa products in a

2 simple, rapid and efficient manner and whereby certain valuable products formed in carrying out the process are obtained.

Another object of the invention is to provide a method of recovering theobromine from cocoa products in such a manner as to enable a solvent which is preferably utilized in the process to be obtained from a substance derived as one of the products of the process and resulting from the treatment of the initial cocoa material in accordance with said process.

A further object of this invention is to provide a process for the simple isolation and purification of theobromine from the herein described cocoa distillate.

A further object of the invention is to provide a process which is particularly well adapted for use in a practically commercial manner for obtaining theobromine from a source material which is lean in theobromine such as for example cocoa shells in which the theobromine is present in relatively small amounts as well as from source materials which contain a larger proportion of theobromine.

A further object is to provide a continuous process of recovering theobromine from material containing same, but it will be understood that the other objects of my invention are not limited to a continuous process but apply as well to non-continuous or "batch" methods.

The above and other objects, features and advantages of this invention will be more fully understood from the following description. It will be understood that any suitable apparatus may be employed in practicing the method of the present invention and that in the accompanying drawing illustrating apparatus which is suitable, the figure is a more or less diagrammatic view of such apparatus.

In accordance with the present invention, the cocoa material which may be comparatively dry and in the form of small particles or which is reduced to such form by grinding or in any other way is subject to the action of heat at an elevated temperature, that is at a temperature at which the theobromine will be disengaged from its complex form and will sublime along with other vapors. More particularly the cocoa material containing the theobromine is heated in a suitable vessel in such manner that the maximum temperature of the gases liberated from said material is between 550° F. and 800° F., the preferred temperature being between about 700° F. and 775° F. The theobromine and other vapors and gases liberated from the cocoa material during the heating thereof in the heating vessel are removed from the solid residue in said vessel into a condenser in which said theobromine vapors, water vapor and other condensible gases are condensed into a condensate or distillate which is collected in a suitable receptacle. By way of example, when cocoa shells are used as the source material for obtaining theobromine, the condensate amounts to approximately 30 lbs. for each 100 lbs. of cocoa shells heat-treated, and consists of approximately the following constituents.

| | Pounds |
|---|---|
| Water | 22 |
| Theobromine | 1 |
| Crude Tar | 4 |
| Carbon | 1 |
| Organic substances, water soluble | 2 |
| Total | 30 |

It is interesting to note that during the distillation water vapor is formed in excess of that contained in the cocoa shells prior to its heat treatment. This water vapor formed by the decomposition of the cocoa shell material serves both as a gas for sweeping the vapors from the heating chamber and as a solvent for the various water soluble organic materials formed.

This condensate which contains the theobromine may conveniently be described as consisting of an aqueous condensate and a tarry condensate.

During the heat treatment of cocoa shells water vapor is first formed followed by acid vapor then by an alkaline vapor and theobromine. By the method of distillation described herein all of these vapors intermingle and any compounds formed by the alkaline vapors with theobromine are decomposed by the acidic vapors which are present in excess of the alkaline vapors. The theobromine and free carbon is distributed in the distillate in both the watery and tarry portions.

Of the approximately 1 lb. of theobromine present in the distillate 0.8 lb. is in the free form and 0.2 lb. is in solution in the hot water portion. This 0.2 lb. of theobromine precipitates out of the water except for about 0.014 lb. as the same is cooled to room temperature as herein described. If the distillate is allowed to cool without the addition of a cutting agent for the tarry portion of the distillate the solid theobromine becomes intermingled with the tar and water and separation is made difficult. This difficulty is over-come by the addition of a solvent for the tar in which the theobromine is insoluble. Any suitable solvent may be used for this purpose. I prefer to use such solvent or cutting method may be used: The condensate which oil obtained from the tarry portion of the distillate as described herein.

The solvent is added to the distillate in the proportion of about 3 to 6 parts in proportion to the tarry part contained in the distillate, while said distillate is warm, say at a temperature of about 100° to 180° F. The solvent which dissolves the tar is relatively insoluble in water and has a lower specific gravity than the aqueous portion, i. e., about 0.95, and collects at the top of the watery layer or aqueous condensate the specific gravity of which is about 1.025.

On allowing the above condensate to stand and cool, the theobromine which is insoluble therein and which has a specific gravity of approximately 1.4, slowly disengages itself from the distillate mixture and precipitates from the tarry layer thru the watery layer to the bottom of the receptacle. The theobromine which precipitates in this manner is of a granular nature in which form it is easier to filter. The bulk of the theobromine falls to the bottom of the vessel but a small amount remains suspended to the junction or interface of the tarry and aqueous layers. A small amount of finely divided theobromine also remains in suspension in the diluted tarry portion of the distillate. The entire distillate is now subjected to filtration. During filtration the watery portion filters thru first, depositing the bulk of the theobromine on the filter, which bulk by reason of its porous nature acts as a filtering aid to the finely divided theobromine contained in the diluted tarry layer. The theobromine residue contained on the filter is washed several times with fresh solvent to remove the small amount of tar solution contained therein. Any suitable solvent can be used for this purpose, for example, carbon tetrachloride. The solvent utilized in diluting the tarry portion of the distillate may be recovered for reuse by distillation from the tarry condensate solution.

The theobromine residue as above described varies in purity of from about 90% to 98% and may be further purified by any of several known methods. I prefer to purify the above theobromine by dissolving approximately 1 lb. thereof in about 140 lbs. of boiling water and adding to the solution approximately 0.1 lb. of an activated carbon. After stirring the boiling solution, it is filtered while hot, care being taken not to allow the solution to cool during filtration. The residue is rinsed several times with fresh boiling water to remove the last amount of theobromine solution held by absorption in the residue. The filtrate is cooled to about 60° F. and allowed to stand for one hour or longer wherein all but about 0.05 lb. of theobromine crystallizes out in a form approximately 99 to 99.5% pure. The theobromine is filtered and dried in any suitable manner.

A practically pure theobromine may be obtained by further treatment of the refined product with hot water and activated carbon. The product so obtained is of a pure white color and may be used for any purpose that theobromine is used.

As a result of heating the cocoa material, several products of commercial value are obtained. The tarry distillate after the removal of the theobromine is subjected to fractional distillation, and the distillate obtained by condensing the vapors therefrom up to a temperature of about 475° F. constitutes a solvent for the tarry portion of the distillate in the recovery of the theobromine. This tar oil may also be used for various other commercial products for which tar oil is used. The residue remaining from the distillation of the tar oil is a heavy tar product which also has commercial value.

It will be understood that during the heating of the cocoa material in the heating vessel or drum for liberating the theobromine and other vapors and gases therefrom, the cocoa material undergoes thermal decomposition and is charred or carbonized so that the residual solid material resulting from the liberation of said vapors or gases is a vegetable carbon. This material amounting to about 46% is removed from the heating vessel and recovered as a useful commercial product. Such carbon may be activated and used as such, or it may be used in animal food mixture, for coloring food products and confectionery, for use as a fuel, for use in paints and pigments, etc.

The watery solution of the distillate after the removal of the theobromine contains about 6% of organic substances in solution which substances possess strong reducing properties and some of them have photographic developing properties i. e. they will bring out an image on photographic or sensitized paper.

The non-condensible gases evolved during the heating of the cocoa material and amounting to about 25% may after suitable treatment be used as a gaseous fuel.

The above method of treating the distillate is the one which I presently prefer, but the following method may be used: The condensate which includes the aqueous condensate and the tarry condensate is drawn off from the condenser into a receptacle where the condensate, upon standing, separates into layers of said aqueous and tarry condensates, respectively. More specifically, the tarry condensate collects in a layer at the top of the aqueous condensate, as the former has a lower specific gravity than the latter. Then, the tarry and aqueous condensates are separated from each other in any suitable way for further treatment thereof, respectively, for recovering the theobromine from these condensates. Upon cooling of the aqueous condensate to room temperature, say about 60° F., substantially all of the theobromine contained in said condensate is precipitated and then can be easily separated from the liquid in any suitable way, preferably by filtration. Although the theobromine which is contained in the tarry condensate is insoluble therein, said tarry condensate requires further treatment to permit the theobromine to be recovered therefrom. For this purpose, said tarry condensate is treated with a suitable solvent which cuts said condensate and enables the theobromine to be separated therefrom by filtration. While any suitable solvent may be used for this purpose, I prefer to use butyl alcohol or isobutyl alcohol. Also, I can use a solvent obtained from the tarry condensate, as hereinbefore described. The quantity of solvent for cutting the tarry condensate may vary, it being understood that the purpose of the solvent is to dilute said condensate so that it can be more readily filtered or otherwise treated to remove the theobromine therefrom. By way of example, it may be stated that from about three to six parts of solvent to each part of tarry condensate is suitable and that when the solvent is added to the tarry condensate in this proportion, the resulting tarry condensate-solution can be readily filtered to recover the theobromine therefrom.

Instead of separating the tarry condensate from the aqueous condensate, preliminary to the separation and recovery of the theobromine from said condensates, respectively, the tarry condensate can be treated with said solvent before the condensates are separated, i. e. the solvent can be added to the tarry condensate in the presence of the aqueous condensate in any suitable receptacle, for example, in the receptacle into which the condensate is withdrawn from the collection receptacle of the condenser. The solvent added to the tarry condensate is insoluble in water and has a lower specific gravity than the aqueous condensate, so that the solution of the tarry condensate collects at the top of the aqueous condensate, and the theobromine being insoluble in the solution of the tarry condensate which collects at the top of the aqueous condensate in said receptacle settles out, in a considerable proportion, from said solution of the tarry condensate into the aqueous condensate and thus is substantially entirely removed from the tarry condensate solution so that most of the theobromine recovered from the cocoa material is thus present in the aqueous condensate. The theobromine thus contained in this aqueous condensate can then be easily recovered therefrom by separating the aqueous condensate from the tarry condensate-solution and by filtering said aqueous condensate or by subjecting the latter to centrifugal action, or in any other suitable way. The quantity of theobromine which might remain in the tarry condensate-solution can be separated therefrom by filtration or in any other suitable way. The solvent utilized in diluting the tarry condensate whether added in the presence of the aqueous condensate or after separation of the tarry condensate from the acqueous condensate can be recovered for re-use by distillation from the tarry condensate solution.

In the accompanying drawing, there is illustrated more or less diagrammatically apparatus which can be used in performing the method of the present invention. As here shown, said apparatus comprises a heating vessel or drum 10 in which the cocoa material containing the theobromine is heated. Said drum is provided with an inlet opening 12 through which said cocoa material is supplied from a hopper 13 by a feeding conveyor screw 14. A rotary conveyor screw 15 is positioned within drum 10 and operates to move the cocoa material longitudinally of said drum from the inlet end thereof to the outlet end thereof. As here shown, said conveyor comprises a rotary shaft 16 which is journalled for rotation at its opposite ends in bearings 18 and 20 mounted at the opposite ends, respectively, of drum 10. Said drum can be heated in any suitable way, as by a fuel burner (not shown). It will be understood that as the cocoa material supplied to the drum through the inlet 12 is moved longitudinally of said drum by conveyor 15, said cocoa material is heated to a temperature at which the theobromine vapors and other vapors and gases are liberated from said material in the drum leaving a solid residue consisting substantially of cocoa carbon. The vapors and gases liberated from the cocoa material in drum 10 during the heating thereof flow from said drum through a plurality of outlet tubes indicated at 21, 22, and 23 to an outlet header 24. The feed of the cocoa material by conveyor 15 longitudinally of the drum and the heating of said material are regulated in any suitable way so that the temperature of the gases and vapors at the outlet 23 is from about 700° F. to about 775° F. which is the preferred temperature range as indicated above. The outlet header 24 communicates with the inlet of a water-cooled condenser 26 in which the theobromine and other vapors and condensable gases are condensed thus producing the condensate which collects in the collection receptacle 28. While condenser 26 may be of any suitable type, it comprises as here shown a series of water jacketed vertically disposed tubes 30, 32 and 34, the lower ends of said tubes being in communication with the closed collection receptacle 28. Condenser 26 is preferably operated under a partial vacuum which is preferably a low or mild vacuum sufficient to insure a flow of the vapors and gases from drum 10 into and through the condenser without resulting in the accumulation of excess pressure in drum 10. As here shown, the outlet end of drum 24 is connected to the water jacketed tube 30. A vacuum pump or other source of vacuum (not shown) is connected to the outlet 35 of tube 34. Accordingly, the vapors and gases flow from the outlet header 24 through the tubes 30, 32 and 34 which are in series and during the flow of said vapors and gases through said tubes, the vapors are cooled and are condensed in said tubes and the resulting condensate formed in said tubes, respectively, flows downwardly therein into the collection receptacle 28. With a condenser of the proper efficiency, substantially all of the condensible vapors and gases are thus condensed and the non-condensible gases are withdrawn through the outlet 35 of the last condenser tube 34. It will be observed that the tube 32 is a reversely bent tube, having the vertical portions 36 and 37 which communicate at their lower ends with the collection receptacle 28 and that said collection receptacle is provided with a partition 38 disposed between the vertical portions 36 and 37 of tube 32, so that the vapors and gases which are not condensed by the tube 30 and the vertical part 36 of tube 32 are required to pass through the vertical part 37 of said last mentioned tube and through the last tube 34 before any of the gases which leave the outlet header 24 can pass through the outlet 35 of the condenser. The solid residual material in drum 10 is expelled therefrom by conveyor screw 15 through an outlet 40 into a receptacle or other device in which the solid residual material is cooled in any suitable way whereby to prevent the same from igniting. Air or gas locks 42 and 44 are provided at the inlet and outlet passages 12 and 40, respectively, so that air or gases cannot pass into or out of the drum into these passages.

The condensates which collect in the receptacle 28 of the condenser 26 are removed from said receptacle thru the valved outlet pipes 46 and 48 to a vessel (not shown) in which said condensate is mixed with the proper amount of tar solvent. Said solvent may be supplied to the condensate in any suitable way such as by means of a proportioning pump 50 which receives the condensate from a supply pipe 54 and propels said condensate and solvent to said vessel for separating the theobromine therefrom. The mixed condensate is allowed to cool and stand for a suitable time whereon practically all of the theobromine precipitates and may be removed by filtration as previously described.

It will be noted that in practicing my invention as described above with reference to the apparatus illustrated in the drawings, the process is carried out in a continuous manner. In this continuous process, the cocoa material is passed continuously through a heating zone (drum 10) where the material, while passing through said zone, is heated to the temperatures at which theobromine in the vapor phase is liberated, with incidental liberation of water and other vapors and non-condensible gas; said vapors and gases are continuously removed from said zone while said material is passing therethrough and are transferred to the condenser 26 for forming the distillate therefrom.

It is understood that the terms and expressions which I have employed in describing my invention are used as terms of description and not of limitations and it will be further understood that the invention may be practiced otherwise than hereinbefore specifically described without departing from the underlying principles thereof.

Having thus described my invention what I claim as new and desire to secure by Letters Patent is:

1. The method of obtaining theobromine from cocoa material containing the same which comprises heating said material at a temperature of about 550° F. for a time sufficient to break up the complexes in said material and to vaporize the theobromine therefrom, with incidental liberation of other vapors, forming a liquid distillate from said theobromine vapors and other vapors liberated from said material by said heating thereof, and separating the theobromine from said distillate.

2. The method of obtaining theobromine from cocoa material containing the same which comprises heating said material at a temperature of about 550° F. for a time sufficient to break up the complexes in said material and to vaporize the theobromine therefrom, with incidental liberation of other vapors, removing said vapors from the residual solid material, condensing said vapors to form a distillate containing theobromine, an aqueous liquid, and a non-aqueous liquid, adding to said distillate a solvent for said non-aqueous liquid and in which solvent the theobromine and aqueous liquid are substantially insoluble, cooling said distillate, and removing the theobromine from the distillate.

3. The method of obtaining theobromine from cocoa material containing the same which comprises heating said material at a temperature of about 550° F. for a time sufficient to break up the complexes in said material and to vaporize the theobromine therefrom, removing said vapors from the residual material and forming a distillate containing theobromine therein, cooling said distillate, and removing the theobromine.

4. The method of obtaining theobromine from cocoa material containing the same which comprises heating said material at a temperature of about 700° F. to 775° F. for a time sufficient to break up the complexes in said material and to vaporize the theobromine therefrom, removing said vapors from the residual material and forming a distillate containing theobromine therein, cooling said distillate, and removing the theobromine.

5. The method of obtaining theobromine from cocoa material containing the same which comprises heating said material at a temperature of about 700° F. to 775° F. for a time sufficient to break up the complexes in said material and to vaporize the theobromine therefrom, with incidental liberation of other vapors, removing said theobromine and other vapors from the residual material and forming a distillate containing theobromine, an aqueous liquid, and a non-aqueous liquid, cooling said distillate, and removing the theobromine from the distillate.

6. The method of obtaining theobromine from cocoa material containing the same which comprises heating said material at a temperature of about 550° F. for a time sufficient to break up the complexes in said material and to vaporize the theobromine therefrom, with incidental liberation of other vapors, removing said vapors from the residual solid material, condensing said vapors to form a distillate containing theobromine, an aqueous liquid, and a non-aqueous liquid, adding to said distillate a solvent for said non-aqueous liquid in the presence of said aqueous liquid and in which solvent the theobromine and aqueous liquid are substantially insoluble, cooling said distillate, and passing said distillate with the solvent therein through a filter to separate the theobromine.

7. The method of obtaining theobromine from cocoa material containing the same which comprises heating said material at a temperature of about 550° F. for a time sufficient to break up the complexes in said material and to vaporize the theobromine therefrom, with incidental liberation of other vapors, removing said vapors from the residual solid material, condensing said vapors to form a distillate containing theobromine and aqueous and non-aqueous liquids, separating the non-aqueous liquid from the aqueous liquid, and removing the theobromine from the aqueous liquid.

8. A process of treating theobromine containing material for obtaining theobromine therefrom, comprising passing said material continuously through a heating zone, heating said material while said material is passing through said zone at a temperature of about 550° F. to 800° F. for a time sufficient to break up the complexes in said material and to vaporize the theobromine therefrom with incidental liberation of other vapors and gases, continuously removing said theobromine and other vapors from said zone while said material is passing therethrough, forming a distillate from said vapors, and treating said distillate to remove the theobromine therefrom.

9. A process of treating theobromine containing material for obtaining theobromine therefrom, comprising passing said material continuously through a heating zone, heating said material at a temperature of about 700° F. to 775° F. for a time sufficient to break up the complexes in said material and to vaporize the theobromine therefrom, while said material is passing through said zone with incidental liberation of other vapors and gases, continuously removing said theobromine and other vapors from said zone to a condenser to form a distillate from said vapors, removing said distillate from the condenser, and treating said distillate to remove the theobromine therefrom.

10. A process of treating theobromine containing material for obtaining theobromine therefrom, comprising passing said material continuously through a heating zone, heating said material at a temperature of about 550° F. to 800° F. for a time sufficient to break up the complexes in said material and to vaporize the theobromine therefrom, while said material is passing through said zone with incidental liberation of other vapors and gases which are condensible to aqueous and non-aqueous constituents, continuously removing said theobromine and other vapors from said zone to a condenser to form a distillate from said vapors, removing said distillate from the condenser, adding to the removed distillate a solvent for the non-aqueous portion thereof and in which solvent the theobromine and aqueous portion are substantially insoluble, cooling said distillate, and separating the theobromine.

11. A process of treating theobromine containing material for obtaining theobromine therefrom, comprising passing said material continuously through a heating zone, heating said material while said material is passing through said zone at a temperature of about 550° F. to 800° F. for a time sufficient to break up the complexes in said material and to vaporize the theobromine therefrom, with incidental liberation of other vapors and gases, continuously removing said theobromine and other vapors from said zone to a condenser to form a distillate from said vapors, and treating said distillate to remove the theobromine therefrom.

12. A process of treating theobromine containing material for obtaining theobromine therefrom, comprising passing said material continuously through a heating zone, heating said material while said material is passing through said zone at a temperature of about 700° F. to 775° F. for a time sufficient to break up the complexes in said material and to vaporize the theobromine therefrom, with incidental liberation of other vapors and gases which are condensible to aqueous and non-aqueous constituents, continuously removing said theobromine and other vapors from said zone to a condenser to form a distillate from said vapors, adding to the distillate a solvent for the non-aqueous portion thereof and in which solvent the theobromine and aqueous portion are substantially insoluble, cooling said distillate, and separating the theobromine.

BENJAMIN J. ZENLEA.

REFERENCES CITED

The following references are of record in the file of this patent:

UNITED STATES PATENTS

| Number | Name | Date |
|---|---|---|
| 1,942,160 | Bebie | Jan. 2, 1934 |
| 1,942,177 | Luthy | Jan. 2, 1934 |
| 2,275,835 | Balmert | Mar. 10, 1942 |
| 1,386,166 | Grousseau et al. | Aug. 2, 1921 |

FOREIGN PATENTS

| Number | Country | Date |
|---|---|---|
| 493,393 | France | Aug. 7, 1919 |

OTHER REFERENCES

Henry, Plant Alkaloids (1913), London, Churchill, pp. 317–18.